United States Patent Office 3,560,328 Patented Feb. 2, 1971

3,560,328 PHENOL-FORMALDEHYDE IMPREGNATED CELLULOSIC SHEETS AND LAMINATES

George J. Anderson, Wilbraham, and Ronald H. Dahms, Springfield, Mass., assignors to Monsanto Company, St. Louis, Mo.

No Drawing. Filed July 25, 1968, Ser. No. 747,433
Int. Cl. B32b *27/08, 27/42*
U.S. Cl. 161—251 10 Claims

ABSTRACT OF THE DISCLOSURE

Impregnated cellulosic sheets and laminates which are cold punchable and have good electrical properties. Such constructions are prepared from cellulosic substrates impregnated with a mixture of carboxylated alkadiene interpolymer and a low molecular weight phenol-formaldehyde resin and then overtreated with a certain higher molecular weight substituted phenol-formaldehyde resin. Laminates are made from the resulting sheet-like members by first advancing same and then laying up and thermosetting under heat and pressure.

BACKGROUND

In the art of making cellulosic sheets and laminates thereof which are impregnated with phenol-aldehyde resins, it has long been appreciated that, while such constructions can be prepared so as to have good electrical properties, it has generally not heretofore been possible to make such constructions so as to have both good electrical properties and cold punchability. In addition to both such properties, such constructions should have relatively good water absorption characteristics, flexural strength characteristics, and cold flow characteristics.

Cold punchable cellulosic laminates having good electrical properties (e.g. low dielectric constants and low dissipation factors) are desirable for use in electrical applications as support or as insulation members for conductive elements. Such laminates are generally used in a sheet or block form which is then punched or otherwise machined to provide a particular desired configuration for individual use situations. Heretofore, in order to obtain good electrical properties, paper or other cellulosic sheet-like substrate member in non-woven or woven form was generally first impregnated with a phenolic resin and then the resulting member was overtreated with a different phenolic resin, the second resin being chosen for its thermoset properties, however, laminate constructions made from sheets so impregnated suffer from a number of undesirable properties, and typically do not have both the properties of cold punchability and good electrical properties in combination with commercially acceptable levels for other properties.

It has now been discovered that a cellulosic substrate, especially one with a low ash content, which has been first impregnated with a combination of low molecular weight phenol-formaldehyde resole resin and carboxylated alkadiene interpolymer and then impregnated with a certain substituted phenol-formaldehyde resole resin (without plasticizer) to make sheet like members is especially well adapted for use in the manufacture of laminates having a surprising and unexpectedly superior combination of excellent cold punchability characteristics and electrical properties.

SUMMARY

This invention is directed to cold punchable, high electrical property laminates made from certain polymer impregnated cellulosic substrates in sheet-like form, to such impregnated substrates themselves, and to methods for making such substrates and such laminates.

The laminates of this invention, in addition to being punchable, are generally characterized by having good water absorption characteristics, good flexural strength characteristics, good cold flow characteristics, and, especially both good electrical dielectric constants and good dissipation factors.

For purposes of this invention, cold punchability is conveniently measured using ASTM Test D–617, water absorption, using ASTM Test No. D–229; flexural strength, using ASTM Test No. D–790; cold flow (or deformation under load), using ASTM Test No. D–621; dielectric constants, using ASTM Test No. D–150; and dissipation factors, using ASTM Test No. D–150. Typical values for cold punchability range from about 75 to 95; for water absorption, from about 0.5 to 0.7%; for flexural strength, from about 15000 to 19000 pounds per sq. in.; for cold flow, from about 0.8 to 1.2% (as measured at 50° C., 4,000 p.s.i. after humidity aging); for dielectric constants, from about 4.2 to 4.7; and for dissipation factors, from about .031 to .038. Those skilled in the art will appreciate that an individual laminate of this invention may not have all properties above indicated with values within the ranges indicated; the above are general characterizations only.

In accordance with the present invention, there is produced an intermediate sheet-like member adapted for use in the manufacture of cold punchable laminates. This sheet member employs a substrate comprising cellulosic fibers arranged into generally integral sheet like form. This is first impregnated with a first composition comprising (dry weight basis) from about 35 to 65 weight percent of a water-soluble phenol-formaldehyde resole resin and the balance up to 100 weight percent of such first composition being a carboxylated alkadiene interpolymer such that the resulting first-impregnated substrate contains from about 5 to 40 weight percent of said first composition (dry weight basis). The resulting so-first-impregnated substrate is next secondly impregnated with a second composition comprising a substituted phenol-formaldehyde resole resin such that the resulting so-secondly impregnated substrate contains from about 30 to 60 weight percent of said second composition (dry weight basis).

To produce such an intermediate sheet member, one employs when first impregnating a first composition comprising from about 5 to 40 weight percent (total composition basis) of a mixture comprising a first dissolved water soluble phenol-formaldehyde resole resin and an aqueous phase colloidially dispersed carboxylated alkadiene interpolymer, from about 5 to 100 weight percent water, and the balance up to 100 weight percent of any given first composition being an organic liquid which:

(1) is substantially inert,
(2) evaporates below about 150° C. at atmospheric pressures, and
(3) is a mutual solvent for said first resole resins.

Such mixture (as indicated above) comprises (dry weight basis) from about 35 to 65 weight percent of said first resole resin and the balance up to 100 weight percent of a given mixture being said carboxylated alkadiene interpolymer.

One impregnates such substrate with such first composition to an extent such that the resulting so imprgnated dried substrate contains from about 5 to 40 weight percent said first composition (dry weight basis).

The first dissolved water soluble phenol-aldehyde resole resin used in the present invention is well known to those skilled in the art. It has a formaldehyde to phenol mol ratio of from about 0.9 to 2.5. It is conveniently separately produced by reacting under aqueous liquid phase conditions phenol with formaldehyde preferably in the presence of an organic basic catalyst to produce a solution containing phenol-formaldehyde resinous condensation product. Such resins having a low molecular weight are preferred, especially those which can be prepared in the form of at least a 55 weight percent aqueous solution. Such a resin solution characteristically has a water dilutability of at least about 1:1, and preferably of at least about 8:1. In addition, this resin has a free formaldehyde content which is less than about 5 weight percent. Preferably, the phenol-formaldehyde mol ratio in this resin ranges from about 1½ to 2. An organic basic catalyst is preferably used in impregnation as indicated so as to produce a resole resin product which will not contain free ions which might conduct an electrical charge after the resin has been thermoset. Suitable organic basic catalysts are well known to the art; examples include triethylamine, hexamethylenetetramine, and the like.

The carboxylated alkadiene interpolymer used in the preparation of the laminate constructions of this invention is one which is conveniently separately prepared as an aqueous phase colloidially dispersed material in the form of a latex in water. Suitable carboxylated alkadiene interpolymers are prepared by polymerizing a monomr mixture comprising from about 3 to 8 weight percent of acrylic acid, from about 35 to 60 weight percent of a conjugated alkadiene monomer, and the balance up to 100 weight percent of any given such monomer, mixture comprising at least one material selected from the group consisting of monovinyl aromatic compounds and alkene nitrile compounds. A minor amount of a surfactant is added to the monomer mixture before polymerization. These latices and methods for their preparation are described in the literature; see, for example, Bovey et al. in the "Smulsion Polymerization," published by Interscienec Publishers, Inc. 1955 and Schildknecht in "Polymer Processes" published by Interscience Publishers, Inc. 1956. Optionally, such an emulsion may have chemically incorporated thereinto through polymerization a small quantity, say, less than about 2 weight percent based on total interpolymer weight, of a divinyl aromatic compound such as divinyl benzene, or the like.

Suitable monovinyl aromatic compounds include styrene (preferred); alkyl-substituted styrenes, such as ortho-, meta-, and para-methyl styrenes, 2,4-dimethyl styrene, para-ethylstyrene, or alphamethyl styrene; halogen substituted styrenes such as ortho-, meta- and para-chlorostyrenes, or bromostyrenes, 2,4-dichlorostyrene; and mixed halogen plus alkyl-substituted styrenes, such as 2-methyl-4-chlorostyrene; vinyl naphthalene; vinyl anthracene; mixtures thereof, and the like. The alkyl substituents generally have less than five carbon atoms, and may include isopropyl and isobutyl groups.

Suitable alkene nitrile compounds include acrylonitrile (preferred), methacrylonitrile, ethacrylonitrile, mixtures thereof, and the like.

Suitable conjugated alkadiene monomers include butadiene, 3-methyl-1,3-butadiene, 2-methyl-1,3-butadiene, piperylene, chloroprene, mixtures thereof and the like. Conjugated 1,3 dienes are preferred.

Such a latex suitable for use in making a first composition for employment in the present invention can contain typically as made from about 30 to 70 parts by weight of total carboxylated alkadiene interpolymer with the balance up to 100 weight percent of a given latex being substantially water. Preferably, such a latex contains from about 45 to 60 parts by weight of such interpolymer.

To prepare a first composition of such dissolved water phenol-aldehyde resin and carboxylated alkadiene interpolymer, one simply admixes the respective materials together. As initially prepared, the resulting composition typically has a total solids content (combined weight of carboxylated alkadiene interpolymer and phenol-formaldehyde resole resin) ranging from about 40 to 65 weight percent. Conveniently, as prepared, the liquid phase of the resulting mixture is substantially entirely water.

In general, an individual cellulosic substrate used in the laminates of the present invention is an integral preformed sheet-like member composed substantially of cellulose fibers in a woven, non-woven, or mixed structure. Typical thicknsses range from about 3 to 30 mils (under about 10 being preferred). Such members are well known to the art and include paper and cloth broadly; they need have no special characteristics. The cellulosic fibers used in such a substrate member can be of natural or synthetic origin and the sheet member can be in a woven or non-woven state. Typical well known sources for cellulose fibers include wood, cotton, and the like. Typically, average cellulosic fibers used in substrates employed in this invention have length to width ratios of at least about 2:1, and preferably about 6:1, with a maximum length to width ratios being variable.

The term "substantially" as used herein in reference to cellulose fibers has reference to the fact that a substrate comprises mainly cellulose fibers with not more than about 5 to 10 percent of any given cellulosic substrate being other components, such as non-fibrous fillers, diluents, and the like, or fibrous non-cellulosic materials, such as those derived from organic sources (e.g. protein, synthetic organic polymeric fibers like polyesters, etc.) or inorganic sources (e.g. siliceous fibers or metallic fibers). Such other components when and if present characteristically have size ranges which are not greater in magnitude than the cellulosic fibers. Preferably, such other components are under 1 weight percent of the total weight of a starting individual cellulosic substrate member.

Particularly when high electrical properties are desired in a product laminate of the invention, the cellulosic substrate member should have a low ash content. Ash contents under 1 weight percent (based on total cellulosic substrate member weight percent of the total weight of a starting individual cellulosic substrate member).

Particularly when high electrical properties are desired in a product laminate of the invention, the cellulosic substrate member should have a low ash content. Ash contents under 1 weight percent (based on total cellulosic substrate member weight) are preferred, and those having ash contents under 0.5 weight percent are more preferred.

Before a first composition is used for impregnation of a preformed cellulosic substrate, it is convenient to dilute such composition with organic liquid (as described above) so that the total solids concentration of such resulting composition typically ranges from about 5 to 40 weight percent (as indicated), with solids contents of 15 to 25 percent being preferred. A primary reason for adding such an organic liquid to such an aqueous composition mixture is to permit one to impregnate a preformed cellulosic substrate such as paper without causing a deterioration in the wet strength thereof effectuated. By adding in with the water such an organic solvent, the wet strength of a preformed cellulosic substrate material after impregnation and before drying to remove volatile liquid is maintained at acceptable and convenient processing levels for subsequent drying, advancing, etc. by machines, etc. of the resulting impregnated sheet before or during the process of making a laminate construction of the invention.

When a first composition is used to impregnate cellulosic fibers not yet formed into a substrate sheet of cellulosic material (woven or non-woven) the first composition may not necessarily contain any such organic liquid, as when a first compasition is added to paper pulp in the manufacture of paper on a Fourdrinier screen or the like.

In general, impregnation of a preformed substrate cellulosic member by a first composition can be accomplished by any conventional means, including spraying, dipping, coating, or the like, after which it is convenient and preferred to dry the so-treated sheet to remove residual volatile components and thereby leave an impregnated sheet-like construction. In drying, care is used to prevent leaving excessive volatile material in the impregnated sheet. In general, a volatile level of less than about 4 percent by weight is desired.

For purposes of this invention, volatile level is conveniently determined by loss in weight after 10 minutes at 160° C. of a sample impregnated sheet. As indicated, a so-impregnated sheet member contains from about 5 to 40 weight percent of solids derived from said first composition.

After a first impregnating procedure, the so-impregnated sheet member is secondly impregnated with a second composition comprising from about 30 to 70 weight percent (total composition basis) of a second dissolved substituted phenol-formaldehyde resole resin, from about 0 to 15 weight percent (total composition basis) of dissolved water, and the balance up to 100 weight percent (total composition basis) being an organic liquid which (similiarly):

(1) is substantially inert,
(2) evaporates below about 150° C. at atmospheric pressures, and
(3) is a mutual solvent for said second resole resin and for said water (if present).

This second impregnation is carried out so that the resulting so-second impregnated substrate contains from about 30 to 60 weight percent of said second composition (dry weight basis).

The second impregnation procedure using such second composition may be similar to the first impregnation procedure (when a preformed sheet is used), with care being used in the subsequent drying to prevent excessive advancing and thermosetting beyond a flow of about 20 percent.

The second resole resin or substituted phenolformaldehyde resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

It will be appreciated that the aldehyde to phenol ratios herein described have reference to the total amount of phenol present before a reaction, including the phenol which is substituted.

The substituted phenol mixture used to make such resin is itself prepared by initially reacting phenol under Friedel-Crafts conditions with a mixture of cyclopentadiene codimers which comprises (when in a form substantially free of other materials wherein the sum of all component compounds of any given such mixture equals substantially 100 weight percent):

(A) From about 50 to 99 weight percent of compounds each molecule of which has:

(1) the dicyclopentadiene nucleus
(2) from 10 through 13 carbon atoms
(3) as nuclear substituents from 0 through 3 methyl groups, and (B) From about 1 to 50 weight percent of compounds each molecule of which is a codimer of cyclopentadiene with at least one acyclic conjugated alkadiene having from 4 through 6 carbon atoms per molecule.

In a preferred such mixture, a minor amount of cyclic and/or acyclic conjugated alkadiene is present, typically less than about 15 weight percent (same basis) and having 5 or 6 carbon atoms per molecule. Thus, such a mixture can comprise:

(A) From about 70 to 90 weight percent of dicyclopentadiene, (B) From about 10 to 30 weight percent of compounds each molecule of which is a codimer of cyclopentadiene with at least one acyclic conjugated alkadiene having from 4 through 6 carbon atoms per molecule, and (C) From about 2 to 15 weight percent of compounds each molecule of which is a cyclic and/or an acyclic conjugated alkadiene having 5 or 6 carbon atoms per molecule.

In another preferred such mixture, both a minor amount (less than about 10 weight percent—same basis) of compounds containing the indene nucleus, and a minor amount (less than about 15 weight percent—same basis) of compounds containing the phenyl vinylidene structure are present. Thus, such a mixture can comprise:

(A) From about 1.5 to 10 weight percent of compounds each molecule of which has:

(1) the indene nucleus
(2) from 9 through 13 carbon atoms
(3) as nuclear substituents from 0 through 4 methyl groups (B) From about 50 to 70 weight percent of compounds each molecule of which has:

(1) the dicyclopentadiene nucleus
(2) from about 10 through 13 carbon atoms
(3) as nuclear substituents from 0 through 3 methyl groups, (C) From about 4 to 10 weight percent of compounds each molecule of which is a codimer of cyclopentadiene with at least one acyclic conjugated alkadiene having from 4 through 6 carbon atoms per molecule, and (D) From about 4 to 30 weight percent of compounds each molecule of which has:

(1) a phenyl group substituted by a vinylidene group,
(2) from 8 through 13 carbon atoms
(3) as substituents from 0 through 3 groups selected from the class consisting of methyl and ethyl.

In still another preferred such mixture, there are controlled, minor amounts (from about 2 to 9 weight percent—same basis) of each of methylcyclopentadiene and codimers of cyclopentadiene with acyclic conjugated alkadienes relative to a major amount (from about 92 to 98 percent—same basis) of dicyclopentadiene. Thus such a mixture can comprise:

(A) From about 92 to 97 weight percent of dicyclopentadiene, (B) From about 1 to 5 weight percent of compounds each molecule of which is a codimers of cyclopentadiene with at least one acyclic conjugated alkadiene having from 4 through 6 carbon atoms per molecule, and (C) From about 1 to 4 weight percent of compounds each molecule of which is a codimer of cyclopentadiene with a methylcyclopentadiene, provided that the sum of (A) and (C) in any given such cyclopentadiene dimer mixture is always at least about 95 weight percent, and preferably about 97 weight percent, thereof (same basis). Preferably, such a mixture contains at least about 3 weight percent (same basis) of (B‴).

Examples of suitable such acyclic conjugated alkadienes (whether or not dimerized as specified above) include butadiene (a four carbon molecule used as specified above), piperylene, isoprene, 1,3-hexadiene, 1-methyl-1, 3-pentadiene, and the like.

At the time when such a mixture is reacted with phenol as indicated, there can be present as diluents inert (e.g. as respects reactivity towards components of such mixture and phenol under Friedel-Crafts reaction conditions) organic compounds, such as aromatic and aliphatic hydrocarbons. While there is no apparent upper limit on the amount of diluent which may be present, it is preferred that the amount of diluent present range from about 5 to 50 weight percent (same basis).

By the phrase "when in a form substantially free of other materials" reference is had to a mixture (e.g. of starting materials, of product, or the like, as the case may be) which is substantially free (e.g. on an analytical or theoretical basis) of substances (like inerts as respects reactivity with phenol under Friedel-Crafts catalysis) other than such mixture itself. For example, the afore-indicated starting mixture of diene codimers could have an inert hydrocarbon diluent admixed therewith such as benzene, lower alkyl substituted benzenes, naphthalenes and alkane hydrocarbons containing from 6 through 10 carbon atoms per molecule.

The term "cyclopentadiene" as used herein refers to the cyclic compound having the structure:

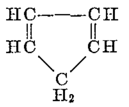

The term "dicyclopentadiene" as used herein refers to the cyclic compound having the structure:

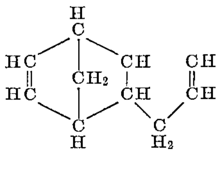

The term "vinylidene" as used herein has generic reference both to vinylidene radicals ($CH_2$=C<), and vinyl radicals ($CH_2$=CH—or—CH=CH—); observe that in mixtures used in this invention having a phenyl group substituted by a vinylidene group, alphamethyl substitution is included in this definition, as well as styrene, methyl styrene, and ethyl styrene.

All solids herein are conveniently measured using ASTM Test Procedure No. D-115-55.

Such a starting material diene codimer compound mixture can be prepared synthetically or derived by suitable preparative procedures from naturally occurring crude petroleum, as those skilled in the art will appreciate. A preferred mixture of such diene codimer compounds for use in this invention is a petroleum derived blend of components having diluents already incorporated thereinto. For example, suitable such mixtures are shown in the following Tables I–III. In Table I is shown an example of such a mixture available commercially under the trade designation "Dicyclopentadiene Concentrate" from the Monsanto Company, St. Louis, Mo.; in Table II, one available commercially under the trade designation "Resin Former P" from Hess Oil and Chemical Co., New York, N.Y., and in Table III, one available commercially under the trade designation "Dicyclopentadiene" from Union Carbide Company, New York, N.Y., and also one available commercially under the trade designation "Dicyclopentadiene" from Eastman Kodak Company, Rochester, New York.

TABLE I

| Component [1] | Total est. wt. percent [2] | Adjusted rel. approx. wt. [3] |
|---|---|---|
| A. Dicyclopentadiene compounds: | | |
| 1. Dicyclopentadiene | 72.1 | 77.1 |
| 2. Codimers of cyclopentadiene and methylcyclopentadiene | 0.4 | 0.4 |
| B. Cyclopentadiene/alkadiene codimers (codimers of cyclopentadiene and acyclic conjugated alkadienes containing from 4 through 6 carbon atoms per molecule [4] | 18.6 | 19.8 |
| C. Conjugated alkadienes (cyclic and acyclic conjugated alkadienes containing 5 and 6 carbon atoms per molecule [5] | 2.2 | 2.3 |
| D. Alkenes: | | |
| 1. Cyclopentene | 0.4 | 0.4 |
| Total of (A), (C), and (D) | 93.7 | 100.0 |
| E. Inert hydrocarbon diluents (total) | 6.3 | |
| 1. Benzene | 0.9 | |
| 2. Methylpentane, methylcyclopentane, and hexane | 5.4 | |

[1] Data in Table I derived from vapor-liquid-phase chromatography and mass spectrography.
[2] Based on total weight of diene dimer compounds and other components including diluents.
[3] Diene codimer compound mixture when in a form substantially free of other materials wherein the sum of all component compounds in any given such mixture equals substantially 100 weight percent.
[4] These aliadienes are usually piperylene and isoprene; composition of such alkadienes is somewhat variable.
[5] These alkadienes are usually piperylene, isoprene, and cyclopentadiene; composition of such alkadienes is somewhat variable.

TABLE II

| Component | Total weight percent basis | | Weight percent diene codimer mixture components only [2] | |
|---|---|---|---|---|
| Arylcycloalkenes | | 1.7 | | 1.9 |
| Indene | 1.7 | | 1.9 | |
| Dicyclopentadienes | | 65.5 | | 74.1 |
| Dicyclopentadiene | 48.9 | | 52.3 | |
| Methyldicylcopentadiene | 15.2 | | 17.2 | |
| Dimethyldicyclopentadiene | 1.4 | | 1.6 | |
| Cyclopentadiene/alkadiene codimers | | 8.0 | | 9.1 |
| Codimers of cyclopentadiene with acylic conjugated alkadienes having from 4 through 6 carbon atoms per molecule: | | | | |
| Codimer with butadiene | 6.0 | | 6.8 | |
| Codimer with isoprene | 2.0 | | 2.3 | |
| Arylalkenes | | 6.9 | | 7.7 |
| Styrene | 5.6 | | 6.3 | |
| Alphamethylstyrene | 1.3 | | 1.4 | |
| Trimers incorporating cyclopentadiene, methylcyclopentadiene or conjugated alkadienes having from 4 through 6 carbon atoms per molecule | | 6.4 | | 7.2 |
| Diene codimer mixture sub-total | | 88.5 | | 100.0 |
| Unidentified components | | 3.1 | | |
| Inert diluents | | 9.4 | | |
| Benzene | 0.1 | | | |
| Toluene | 3.7 | | | |
| Xylene and ethylbenzene | 5.1 | | | |
| Naphthalene | 0.5 | | | |

[1] These values derived using a combination of vapor liquid phase chromatography and mass spectrometry.
[2] When in a form substantially free of other materials wherein the sum of all component compounds of any given such mixture equals substantially 100 weight percent.

TABLE III

| Component | Union Carbide wt. percent) [1] | Eastman Kodak (wt. percent) [1] |
|---|---|---|
| Dicyclopentadienes | 93.2 | 95.6 |
| Methyldicyclopentadienes | 3.0 | 0.9 |
| Cyclopentadiene/acyclic conjugated diene codimers | 2.5 | 1.9 |
| Heavy ends [2] | 0.2 | 0.6 |
| Unidentified | 1.1 | 1.0 |

[1] These values derived using a combination of vapor liquid phase chromatography and mass spectrometry.
[2] Heavy ends here compromise primarily trimers of such components as cyclopentadiene, methylcyclopentadiene, and conjugated alkadienes containing from 4 through 6 carbon atoms per molecule. Typically, these heavy ends are reactive with phenol under Friedel-Crafts conditions as taught herein.

To react phenol with such an aforedescribed cyclopentadiene codimer mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the phenol and suitable Friedel-Crafts acid catalyst are mixed, brought to the proper temperature and the diene codimer compound mixture metered into the acidified (or catalyzed) phenol.

basis in a form substantially free of other materials) in the presence of less than about 10 weight percent (based on the phenol) of acid catalyst.

The reaction mass is then heated to a temperature in the range of from about 25 to 200° C. The rate of this reaction is dependent, to some degree, on the temperature employed. In general, the reaction is rapid, and a complete reaction between phenol and diene codimer compound mixture is preferred. Suitable process variables are sumarized in Table IV below.

TABLE IV

| Process variable | Broad range | Preferred range |
|---|---|---|
| Temperature, ° C | About 25 to 200° C | About 70 to 125° C. |
| Reaction time | Less than about 4 hours | About 10 to 30 minutes. |
| Catalyst (based on phenol) | Less than about 10 weight percent | About 0.1 to 1.0 weight percent. |
| Inert hydrocarbon content (based on total weight diene codimer compound mixture and diluent). | Up to about 50 weight percent | About 2 to 10 weight percent. |
| Total diene codimer compound mixture[1] (based on 100 parts by weight phenol). | About 10 to 100 parts by weight | About 20 to 70 parts by weight. |

[1]On a 100 weight percent basis in a form substantially free of other materials.

For purposes of this invention, the reaction of diene codimer compound mixture with phenol is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted diene codimer compound using, for example, vapor phase chromatography.

Friedel-Crafts catalysts which may be used in place of aluminum chloride, or together with aluminum chloride, include:

(A) Other inorganic halides, such as gallium, titanium, antimony and zinc halides (including $Z_nCL_2$);

(B) Inorganic acids, such as sulphuric, phosphoric and the hydrogen halides (including HF);

(C) Activated clays, silica gel alumina, and the like;

(D) $BF_3$ and $BF_3$ organic complexes including complexes of $BF_3$ with organic compounds, such as ethanol, butanol, glycol, phenol, cresol, anisole, ethyl ether, isopropyl ether, di-n-butyl ether, formic acid, acetic acid, and propionic acid, or with inorganic acids, such as phosphoric acid, sulfuric acid, and the like; and (E) Alkyl, aryl and aralkyl sulfonic acids, such as ethane-sulfonic acid, benzene sulfonic acid, benzene disulfonic acid, chlorobenzene sulfonic acid, cresol sulfonic acids, phenol sulfonic acids, toluene sulfonic acids, xylene sulfonic acids, octylphenol sulfonic acid, B-naphthalene sulfonic acid, 1-naphthol-4-sulfonic acid, and the like.

When $BF_3$, as such, is employed, it is conveniently fed to a reaction mixture in gaseous form. While any combination of diene codimer compound starting mixture, phenol and catalyst can be used, it is particularly convenient to react for each 100 parts by weight of phenol about 10 to 100 by weight parts of such diene codimer compound mixture (on a 100 weight percent In general, the produce as second resole phenol-formaldehyde resin for use in this invention from a substituted phenol product prepared as just described, such product is neutralized under aqueous liquid phase conditions as by the addition of base, and then from about 0.8 to 2.0 moles of formaldehyde per one mole of (starting) phenol is mixed with the substituted phenol product (now itself a starting material). Also a basic catalyst material such as hexamethylenetetramine, ammonium hydroxide, triethylamine, sodium hydroxide, mixtures thereof, and the like, is introduced into the reaction mixture. The pH of this reaction mixture using such basic catalyst is maintained above about 7.0.

It will be appreciated that the formaldehyde to phenol ratios herein described have reference to the total amount of phenol present before a reaction, including the phenol which is substituted by the diene codimer compound mixture, as described above. Aqueous liquid phase preparation conditions are generally but not necessarily used.

To optimize electrical properties in such resole products it is preferred to use as a basic catalyst, when reacting such substituted phenols with formaldehyde, one which is organic (substantially non-ionic) in character, such as triethylamine, or the like. Suitable process variables for making such resole are summarized in Table V below:

TABLE V

| Process variable | Broad range | Preferred range |
|---|---|---|
| Formaldehyde/phenol, mol ratio | About 0.8–2.0 | About 1.0–1.5. |
| Catalyst, parts by weight (based on 100 parts by weight total phenol after neutralization of starting phenol). | About 0.1–10 | About 0.5–4. |
| pH | Above about 7.0 | About 7.5–8.5. |
| Temperature | About 60° C. to reflux | About 80° C. to reflux. |
| Reaction time | Under about 4 hours | About 20–120 minutes. |

The second resole product produced by reacting the substituted phenol with adehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole product having characteristics generally as described above. Such a resole can be regarded as being the reaction product of the above-described substituted phenol mixture and formaldehyde under aqueous base catalyzed conditions as described which product can be thermoset by heat alone without the use of a curing catalyst. In general, however, such resole product as made is a brown colored, unstable, multiphase aqueous emulsion whose viscosity depends, in any given instance, upon process and reactant variables but which usually ranges from a syrupy liquid to a semi-solid state. A resole product derived from such aqueous phase as a brown colored material whose viscosity varies from a syrup to a solid. Such emulsion is preferably dehydrated and formed into a varnish for use in making the impregnated sheet products of this invention.

Thus, when such emulsion is dehydrated under heat and reduced pressure to a water content generally under about 15 weight percent but over about 2 weight percent, there is produced a single-phased, clear, resole resin in the physical form usually of a high solids viscous dark fluid. In any given instance, its total solids content, (residual) water content, and viscosity depend upon the amount of substituted phenol aldehyde product present, the mole ratio of aldehyde to substituted phenol, type and amount of methylolation catalyst, conditions and reactants used to substitute the phenol, methylolation temperature, degree of advancement and the like.

When such a dehydrated liquid second resole is further dehydrated to a water content under about 2 weight percent, there is produced a solid, so-called "one-stage lump resin" which consists substantially of pure resin. Usually the water content after such a dehydration is not less than about 0.5 weight percent of the product resin, in general.

Suitable second resole dehydration conditions typically involve the use of a vacuum ranging from about 25 to 28 inches Hg and temperature ranging from about 40 to 90° C. Higher and lower temperatures and pressures can be employed as those skilled in the art appreciate.

To prepare a varnish from a dehydrated second resole product as described above, such resole is then conveniently dissolved in a relatively volatile, inert organ solvent medium having properties generally as defined above. It is not necessary, and it is preferred not, to prepare the resole resin in the form of a solid before dissolution thereof in organic solvent. In general, the water content of the partially dehydrated resole material is controlled so that the water content of the solution of resole resin in such solvent medium (the varnish) is below about 15 weight percent (based on total weight).

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvent for a given resin, including benzene, toluene, xylene, naphthalene, nonone, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken when using this procedure to use an organic liquid system in which the phenolic resole resins are completely soluble as well as any water present. Adding, for example, a ketone or an ether solvent like butyl cellosolve generally improves the water tolerance (ability to dissolve water) of a solvent system.

The varnishes thus made typically consist of:

(A) From about 20 to 75 weight percent of the above described substituted phenol-formaldehyde resole resin, (B) From about 0.5 to 15 weight percent of dissolved water, and (C) The balance up to 100 weight percent of any given varnish being an organic liquid which:

(1) is substantially inert (as respects such resin mixture),
(2) boils (evaporates) below about 150° C. at atmospheric pressures,
(3) is a mutual solvent for such resin and for such water (if present).

These varnishes are characteristically dark colored, one-phase, clear liquid solutions having a viscosity ranging from about 5 to 5000 centipoises, the exact viscosity of a given varnish depending upon chemical process and product variables used in manufacture. For impregnating applications, viscosities of from about 50 to 500 centipoises are preferred.

The total solids content of a given varnish product can be as high as about 85 weight percent or even higher and as low as about 20 weight percent or even lower, but preferred solids contents usually fall in the range of from about 25 to 65 weight percent.

To use a cellulosic substrate which has been first and secondly impregnated as described above for the manufacture of laminates, it is preferred to employ such a twice impregnated intermediate sheet member which has been advanced to an extent such that it has a flow of from about 3 to 20 percent (preferably from about 5 to 15 percent). To so advance a sheet member to such a flow, it is convenient to heat in air such an intermediate sheet to temperatures in the range of from about 30 to 180° C. for a time sufficient to advance same to the so-desired extent. It will be appreciated that such an advancement can be conveniently accomplished while residual volatile materials are being removed in a drying operation after impregnation, as indicated above.

Intermediate sheet like members of this invention, whether advanced to the extent indicated or not, are generally at least about 4 mils thick and can be as thick as 20 mils, though thicknesses not more than about 10 mils are preferred.

The density of an individual intermediate sheet-like member is relatively unimportant since the laminate, as described below, is formed under heat and pressure conditions which generaly solidify all components together into an integral, solid, non-porous, thermoset mass.

To make a laminate construction of this invention, one forms at least one sheet like member (preferably advanced as described above) into a layered configuration which is at least two layers thick with adjoining layers being substantially in face-to-face engagement. As those skilled in the art will appreciate, an individual laminate construction of the invention can comprise a series of different impregnated cellulosic substrate members at least one of which is an intermediate sheet like member of this invention or it can comprise a series of similar such intermediate members depending upon properties desired in the product laminate.

Such a layered configuration is then subjected to pressure in the range of from about 50 to 200 p.s.i. while maintaining temperatures in the range of from about 120° to 180° C. for a time sufficient to substantially completely thermoset the composite and thereby produce a desired laminate. Preferably, the laminate is pressed at 140–160° C. at 500–1500 p.s.i. for 15–60 minutes. It is preferred to use sheet members of this invention as the sole components for laminates of this invention.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on weight basis.

Examples of second impregnating composition suitable for use in this invention are prepared as follows. In this example, the substituted phenol-formaldehyde resole resin used in each instance has an aldehyde to (theoretical) phenol ratio of from about 0.8 to 2.0, is produced by reacting under aqueous liquid phase conditions formaldehyde and an indicated substituted phenol mixture in the presence of an organic basic catalyst, is substantially insoluble in water but soluble in acetone to an extent that a 55 weight percent solution thereof, in acetone can be prepared, and has a free formaldehyde content of less than about 5 weight percent. The substituted phenol mixture itself is prepared by reacting the diene codimer mixture with phenol at a temperature ranging from about 25 to 200° C. using from about 35 to 80 parts of weight of such diene codimer mixture (excluding diluents) for each 100 parts by weight of phenol.

EXAMPLE A 100 parts of phenol and 1 part of concentrated sulphuric acid as an acid catalyst are charged to a suitable reaction vessel and heated to 125° C. 25 parts of a diene codimer mixture available commercially from the Monsanto Company under the trade designation "Dicyclopentadiene Concentrate" and having a composition as shown in Table I above is added to the starting mixture while keeping the temperature stable at 125° C. The temperature of the resulting mixture is held at 125° C. after addition of the diene codimer mixture for 1 hour and then to this resulting mixture is added 2 parts hexamethylenetetramine, 2 parts of triethylamine and 60 parts of 50% Formalin (50/50 formaldehyde-water). Now this reaction mixture is heated to a reflux at 100° C. and is refluxed thusly for 1 hour. Then the reaction mixture is cooled and volatile materials are removed under a vacuum or 28 inches of mercury until the temperature of the mixture rises to 80° C. Then 50 parts of methanol and 10 parts of acetone are added to the resin product to form a clear solution which thermally crosslinks to a clear film.

EXAMPLES B THROUGH M

The following examples are presented in tabular form for brevity. The process in all instances is as in Example A except that the indicated variables are altered as shown in Table VII below in each respective instance. The numbers listed under "Type Catalyst' 'in Table VI designate specific Friedel-Crafts catalysts as follows: (1) $H_2SO_4$; (2) $BF_3$, diethyl ether. The numbers listed under "Type Diene Codimer Mixture" designate specific mixtures as follows: A refers to Monsanto "Dicyclopentadiene Concentrate" having the composition found in Table I. B refers to Hess Oil & Chemical's "Resin Former P" having the composition found in Table II. C refers to Eastman Kodak's "Dicyclopentadiene" having the composition found in Table III. D is a synthetic mixture of 80 weight percent dicyclopentadiene and 20 weight percent cyclopentadiene-butadiene codimer.

comprising styrene, butadiene, and about 4 to 6 weight percent acrylic acid and having about 48% by weight solids colloidally dispersed in an aqueous medium (known as Dow 636 latex and available from the Dow Chemical Co., Midland, Mich.). The resulting mixture contains about 52 weight percent solids.

To this resulting mixture is added about 320 parts by weight of a 270/50 mixture of isopropanol/water with stirring to produce a product mixture having a total solids content of about 20 weight percent.

EXAMPLE O

Part A

Charge 100 parts of phenol and 111 parts of 50% formalin (50/50 formaldehyde-water) to suitable reaction vessel. Add 5 parts of triethylamine to the vessel and react the mixture at 70° C. under reflux conditions to an end point of about 3.25% free formaldehyde. The reaction is then cooled to 25° C. The resin obtained is a low-molecular weight pretreat phenolic resin and recovered as a 56% resin solids aqueous solution.

Part B

The 100 parts of the resin of Example O, Part A mix 100 parts of a commercially available carboxylated styrene-butadiene (50/40) latex containing 48% solids. To this mixture containing 52% solids add 320 parts of a 270/50 mixture of isopropanol/water with stirring to obtain a 20% solids solution of the latex dispersed with the resin.

This latex is a carboxylated alkadiene interpolymer of styrene butadiene and acrylic acid as described above and known commercially as Dow 636 Latex (available from the Dow Chemical Company Midland, Mich.).

EXAMPLE P

Part A

A pressure vessel is charged with water (140 parts), styrene (45 parts), butadiene (50 parts), acrylic acid (5 parts), Triton X–770 (2 parts), Triton X–100 (1 part), sodium bisulfite (0.10 part) and potassium persulfate (0.25) the persulfate and bisulfite are added incrementally during the reaction. After heating at 50° C. for 30 hours

TABLE VI

| Example No. | Phenol | Type catalyst | Amount catalyst | Type diene codimer mixture | Amount diene codimer mixture | Reaction temperature, ° C. | Post reaction time, minutes |
|---|---|---|---|---|---|---|---|
| B | 100 | 1 | 0.3 | A | 25 | 125 | 15 |
| C | 100 | 1 | 1.0 | B | 25 | 125 | 15 |
| D | 100 | 1 | 1.0 | C | 25 | 125 | 15 |
| E | 100 | 1 | 1.0 | D | 25 | 125 | 15 |
| F | 100 | 1 | 1.0 | A | 50 | 160 | 45 |
| G | 100 | 1 | 1.0 | B | 50 | 160 | 45 |
| H | 100 | 1 | 1.0 | C | 50 | 160 | 45 |
| I | 100 | 1 | 1.0 | D | 50 | 160 | 45 |
| J | 100 | 2 | 0.1 | A | 25 | 75 | 15 |
| K | 100 | 2 | 0.1 | B | 25 | 75 | 15 |
| L | 100 | 2 | 0.1 | B | 25 | 75 | 15 |
| M | 100 | 2 | 0.1 | D | 25 | 75 | 15 |

Examples of first impregnating compositions suitable for use in this invention are prepared as follows:

EXAMPLE N

A water soluble resole resin of phenol and formaldehyde is prepared as follows:

Phenol (100 parts), 50% formalin (111 parts) and triethylamine (5 parts) are charged to a vessel. After reacting at 70° C. until the mixture's free formaldehyde content is less than 4 percent, the mixture is cooled. The resin product contains about 55 percent solids dissolved in water.

To this product is added 100 parts by weight of a carboxylated alkadiene interpolymer latex as described above latex is vacuum stripped to 50% solids. Triton X–100 is a trade mark of the Rohm & Haas Company for its octyl phenoxy polyethyline oxide surfactant containing 9 to 10 ethyline oxide units per molecule. Triton X–770 is a trade mark of the Rohm & Haas Company for its sodium aryl alkyl polyether sulfate surfactant.

Part B

The latex of Example P, Part A (100 parts) is then mixed with 100 parts of the resin of Example O, Part A. To this mixture containing 52% solids add 320 parts of a 270/50 mixture of isopropanol/water with stirring to obtain a 20% solids solution of the latex-dispersed with the resin.

EXAMPLE Q

Part A

A pressure vessel was charged with water (140 parts), acrylonitrile (25 parts), butadiene (70 parts), acrylic acid (5 parts), Nekal Bx (3 parts), sodium pyrophosphate (0.3 part), sodium bisulfite (0.1 part) and potassium persulfate (0.25 part). The persulfate and bisulfite were added incrementally during the reaction. After heating at 50° C. for 22 hours the latex was vacuum stripped to 50% solids. Nekal Bx is a trade mark of the General Aniline Company for its sodium alkyl naphthalene sulfate surfactant.

Part B

The latex of Example Q, Part A is then mixed with 100 parts of the resin of Example O, Part A. To this mixture containing 52% solids add 320 parts of a 270/50 mixture of isopropanol/water with stirring to obtain a 20% solids solution of the latex-dispersed in the resin.

Examples of intermediate sheet-like members of this invention are prepared as follows:

EXAMPLES 1 TO 18

Samples of preformed cellulosic substrate types are chosen, as follows:

Type 1: Non-woven cotton linters paper, about 10 mils in thickness.

Type 2: Non-woven unbleached kraft paper about 7 mils in thickness.

Type 3: Non-woven and cellulose paper about 10 mils in thickness.

Type 4: Non-woven bleached kraft paper about 15 mils in thickness.

Type 5: Woven cotton duck cloth about 8 oz. weight.

Type 6: Woven linen cloth about 4 oz. weight.

All types have an ash content less than about 0.9 weight percent.

The impregnation procedure for twice impregnating each above substrate is as follows:

Preformed cellulosic sheets are passed through the first impregnating solution (Example O, Part B), drawn through the nip region between a pair of squeeze rolls to remove excess resin and hung in an oven at 135° C. for drying to a volatile content of less than 2%. Volatile content is the loss of weight of the dried impregnated sheet after exposure to 160° C. for 10 minutes. A resin content of about 25% is thus obtained in each sample sheet so treated (or otherwise as shown in Table VII below).

Next, the so-first impregnated sheets obtained above are passed through the second impregnating resin solution (Example A), drawn between squeeze rolls and dried in a 135° C. oven to obtain in each sheet a total impregnated solids content of about 60% and a flow of 5%.

For purposes of this invention, flow of a green resin sheet is determined by the following procedure.

From an impregnated sample sheet, 6–2" diameter discs are cut and assembled together in deck fashion in face-to-face engagement. Then, to opposed faces of the resulting deck there is applied about 1000 p.s.i.g. pressure using 150° C. for 5 minutes. Thereafter, the discs are cooled and any resin which has exuded from the discs is removed by abrasion, scraping, or the like. The difference in weight between the green sandwich and the pressed sandwich is flow.

The volatile content of each such sheet is less than 5%. The results are summarized in Table VII below.

TABLE VII

| | | Pretreat resin | | Overtreat resin | | |
|---|---|---|---|---|---|---|
| | Preformed sheet type | Type | Resin content in sheet (dry wt. basis) | Type | Resin content in sheet (dry wt. basis) | Percent flow in product sheet |
| Example No.: | | | | | | |
| 1 | 1 | N | 20 | F | 59 | 4 |
| 2 | 1 | N | 30 | F | 61 | 5 |
| 3 | 2 | O, part B | 26 | B | 56 | 5 |
| 4 | 3 | P, part B | 25 | C | 59 | 6 |
| 5 | 4 | Q, part B | 26 | D | 59 | 6 |
| 6 | 5 | O, part B | 23 | E | 55 | 9 |
| 7 | 6 | N | 29 | J | 59 | 8 |
| 8 | 5 | N | 16 | J | 59 | 5 |
| 9 | 5 | P, part B | 25 | K | 60 | 4 |
| 10 | 5 | Q, part B | 25 | L | 61 | 4 |
| 11 | 1 | O, part B | 15 | G | 60 | 3 |
| 12 | 1 | O, part B | 20 | H | 61 | 3 |
| 13 | 1 | P, part B | 25 | I | 59 | 4 |
| 14 | 1 | Q, part B | 25 | J | 58 | 6 |
| 15 | 2 | N | 20 | F | 59 | 6 |
| 16 | 2 | N | 20 | G | 61 | 7 |
| 17 | 1 | N | 20 | H | 58 | 5 |
| 18 | 2 | N | 20 | I | 58 | 4 |

Examples of laminates of this invention are prepared as follows:

EXAMPLES 19 TO 26

Using the intermediate sheet-like members prepared above in Examples 1–18, laminates are prepared.

The lamination procedure involves the steps of first assemblying a prechosen plurality of intermediate sheet-like members into a deck or sandwich and then applying to the opposed exposed faces of the resulting deck appropriate heat and pressure for a time sufficient to substantially completely cure the impregnated resins and produce the desired laminates. These laminates have excellent cold punchability and electrical characteristics. The details are summarized in Table VIII below:

TABLE VIII

| | Impregnated cellulosic sheet members as described in Example No.— | No. of used | Laminate forming conditions | | |
|---|---|---|---|---|---|
| | | | Pressure, p.s.i. | Temperature, ° C. | Time, min. |
| Example No.: | | | | | |
| 19 | 1 | 5 | 1,000 | 160 | 30 |
| 20 | 2 | 8 | 1,000 | 150 | 30 |
| 21 | 3 | 6 | 1,300 | 150 | 30 |
| 22 | 4 | 6 | 1,000 | 140 | 45 |
| 23 | 5 | 7 | 1,000 | 150 | 30 |
| 24 | 6 | 8 | 1,000 | 150 | 30 |
| 25 | 7 | 8 | 1,000 | 150 | 30 |
| 26 | 8 | 8 | 1,000 | 150 | 30 |
| 27 | 9 | 6 | 1,000 | 160 | 30 |
| 28 | 10 | 7 | 1,000 | 160 | 30 |
| 29 | 11 | 6 | 1,000 | 160 | 30 |
| 30 | 12 | 5 | 1,000 | 160 | 30 |
| 31 | 13 | 8 | 1,000 | 160 | 30 |
| 32 | 14 | 8 | 1,000 | 160 | 30 |
| 33 | 15 | 6 | 1,000 | 160 | 30 |
| 34 | 16 | 7 | 1,000 | 160 | 30 |
| 35 | 17 | 7 | 1,000 | 160 | 30 |
| 36 | 18 | 7 | 1,000 | 160 | 30 |

What is claimed is:

1. An intermediate sheet-like member adapted for use in the manufacture of cold punchable laminates comprising:

(A) a substrate comprising cellulosic fibers arranged into a generally integral sheet like form, (B) said substrate being first impregnated with a first composition comprising (dry total weight basis) from about 35 to 65 weight percent of a water-soluble phenol-formaldehyde resole resin and the balance up to 100 weight percent of said first composition being a carboxylated alkadiene interpolymer such that said so-first-impregnated substrate contains from about 5 to 40 weight percent of said first composition (dry total weight basis)

(C) said substrate being secondly impregnated with a second composition comprising a substituted phenol-formaldehyde resole resin such that said so-second impregnated substrate contains from about 30 to 60 weight percent of said second composition (dry total weight basis)

(D) said substituted phenol-formaldehyde resole resin being characterized by:

(1) having a formaldehyde to phenol mol ratio of from about 0.8 to 2.0.

(2) being produced by reacting under aqueous liquid phase conditions formaldehyde and a substituted phenol mixture in the presence of catalyst, (3) being substantially insoluble in water but having a viscosity in methanol solution at 60 weight percent solids concentration not greater than about 5000 centipoises, and (4) having a free formaldehyde content which is less than about 5 weight percent, (E) said substituted phenol mixture having been prepared by reacting phenol under Friedel-Crafts conditions with from about 10 to 100 parts by weight for each 100 parts by weight of said phenol of a mixture of cyclopentadiene codimers, (F) said mixture of cyclopentadiene codimers comprising (when in a form substantially free of other materials wherein the sum of all component compounds of any given such mixture equals substantially 100 weight percent):

(1) from about 50 to 99 weight percent of compounds each molecule of which has:

(a) the dicyclopentadiene nucleus (b) from 10 through 13 carbon atoms (c) as nuclear substituents from 0 through 3 methyl groups, and (2) from about 1 to 50 weight percent of compounds each molecule of which is a codimer of cyclopentadiene with at least one acyclic conjugated alkadiene having from 4 through 6 carbon atoms per molecule.

2. The product of claim 1 wherein said mixture of cyclopentadiene codimers comprises (same basis):

(A) from about 70 to 90 weight percent of dicyclopentadiene, (B) from about 10 to 30 weight percent of compounds each molecule of which is a codimer of cyclopentadiene with at least one acyclic conjugated alkadiene having from 4 through 6 carbon atoms per molecule, and (C) from about 2 to 15 weight percent of compounds each molecule of which is a cyclic and/or an acyclic conjugated alkadiene having 5 or 6 carbon atoms per molecule.

3. The product of claim 1 wherein said mixture of cyclopentadiene codimers comprises (same basis):

(A) from about 1.5 to 10 weight percent of compounds each molecule of which has:

(1) the indene nucleus (2) from 9 through 13 carbon atoms (3) as nuclear substituents from 0 through 4 methyl groups (B) from about 50 to 70 weight percent of compounds each molecule of which has:

(1) the dicyclopentadiene nucleus (2) from about 10 through 13 carbon atoms (3) as nuclear substituents from 0 through 3 methyl groups, (C) from about 4 to 10 weight percent of compounds each molecule of which is a codimer of cyclopentadiene with at least one acyclic conjugated alkadiene having from 4 through 6 carbon atoms per molecule, and (D) from about 4 to 30 weight percent of compounds each molecule of which has:

(1) a phenyl group substituted by a vinylidene group, (2) from 8 through 13 carbon atoms (3) as substituents from 0 through 3 groups selected from the class consisting of methyl and ethyl.

4. The product of claim 1 wherein said mixture of cyclopentadiene codimers comprises (same basis)

(A) from about 92 to 97 weight percent of dicyclopentadiene, (B) from about 1 to 5 weight percent of compounds each molecule of which is a codimer of cyclopentadiene with at least one acyclic conjugated alkadiene having from 4 through 6 carbon atoms per molecule, and (C) from about 1 to 4 weight percent of compounds each molecule of which is a codimer of cyclopentadiene with a methylcyclopentadiene, provided that the sum of (A) and (C) in any given such cyclopentadiene dimer mixture is always at least about 95 weight percent, thereof.

5. A product of claim 1 which has been heated to an elevated temperature for a time sufficient to advance said composition to an extent such that said member has a flow of from about 3 to 20 percent.

6. A laminate construction comprising:

(A) At least one sheet-like member of claim 5 arranged into a layered configuration which is at least two layers thick with adjoining layers being substantially in face-to-face contact, and (B) such layered configuration having been subjected to elevated pressures and elevated temperatures for a time sufficient to substantially completely thermoset said first composition and said second composition and to bond adjoining layers together in face-to-face engagement thereby to form the desired laminate construction.

7. In a process for making an intermediate sheet-like member adapted for use in the manufacture of cold punchable laminates using as a starting material a substrate of cellulosic fibers arranged into a generally integral sheet-like form which has been first impregnated with a first composition comprising (dry total weight basis) from about 35 to 65 weight percent of a water-soluble phenol-formaldehyde resole resin and the balance up to 100 weight percent of said first composition being a carbocyclic alkadiene interpolymer such that said so-first-impregnated substrate contains from about 5 to 40 weight percent of said first composition, the improvement which comprises the steps of:

(A) secondly impregnating a said so-first-impregnated laminate with a second composition comprising (dry total weight basis) from about 30 to 60 weight percent of a dissolved substituted phenol-formaldehyde resole resin, from about 0 to 15 weight percent of dissolved water, and the balance up to 100 weight percent (total second composition basis) being an organic liquid which:

(1) is substantially inert.

(2) evaporates below about 150° C. at atmospheric pressure, and (3) is a mutual solvent for said substituted phenol-formaldehyde resole resin and for said water (if present), to an extent such that the resulting so-impregnated substrate contains from about 30 to 70 weight percent of said second composition, (B) said substituted phenol-formaldehyde resole resin being chaarcterized by:

(1) having a formaldehyde to phenol mol ratio of from about 0.8 to 2.0, (2) being produced by reacting under aqueous liquid phase conditions formaldehyde and a substituted phenol mixture in the presence of a basic catalyst, (3) being substantially insoluble in water but having a viscosity in methanol solution at 60 percent solids concentration not greater than about 5000 centipoises, and (4) having a free formaldehyde content which is less than about 5 weight percent, (C) said substituted phenol mixture having been prepared by reacting phenol under Friedel-Crafts conditions with from about 35 to 80 parts by weight for each 100 parts by weight of said phenol of a mixture of cyclopentadiene codimers, (D) said mixture of cyclopentadiene codimers (when in a form substantially free of other materials wherein the sum of all component compounds of any given such mixture equals substantially 100 weight percent):

(1) from about 50 to 99 weight percent of compounds each molecule of which has:

(a) the dicyclopentadiene nucleus (b) from 10 through 13 carbon atoms (c) as nuclear substituents from 0 through 3 methyl groups, and (2) from about 1 to 50 weight percent of compounds each molecule of which is a codimer of cyclopentadiene with at least one acyclic conjugated alkadiene having from 4 through 6 carbon atoms per molecule.

8. A process for making an intermediate sheet-like member adapted for use in the manufacture of cold punchable laminates comprising the steps of:

(A) first impregnating a substrate comprising cellulosic fibers arranged into a generally integral sheet like form with a first liquid composition comprising a mixture of a first dissolved water soluble phenol-formaldehyde resole resin and an aqueous phase colloidially dispersed carboxylated alkadiene interpolymer, the liquid portion of said first composition being water and an organic liquid which (1) is substantially inert (2) evaporates below about 150° C. at atmospheric pressure, and (3) is a mutual solvent for said first resole resin and said water, thereby to produce an impregnated sheet-like member wherein the impregnated material comprises (dry total weight basis) from about 35 to 65 weight percent of said first resole resin and the balance up to 100 weight percent said carbocyclic alkadiene interpolymer, the resulting so impregnated substrate containing from about 5 to 40 weight percent of said impregnated material.

(B) secondly impregnating a said so-first-impregnated laminate with a second composition comprising (dry total weight basis) from about 30 to 70 weight percent of a second dissolved substituted phenol-formaldehyde resole resin, from about 0 to 15 weight percent of dissolved water, and the balance up to 100 weight percent (total second composition basis) being an organic liquid which:

(1) is substantially inert, (2) evaporates below about 150° C. at atmospheric pressures, and (3) is a mutual solvent for said second resole resin, and for said water (if present), to an extent such that the resulting so-impregnated substrate contains from about 30 to 70 weight percent of said second composition, (C) said second dissolved substituted phenol-formaldehyde resole resin being characterized by:

(1) having a formaldehyde to phenol mol ratio of from about 0.8 to 2.0, (2) being produced by reacting under aqueous liquid phase conditions formaldehyde and a substituted phenol mixture in the presence of a basic catalyst, (3) being substantially insoluble in water but having a viscosity in methanol solution at 60 weight percent solids concentration not greater than about 5000 centipoises, and (4) having a free formaldehyde content which is less than about 5 weight percent, (D) said substituted phenol mixture having been prepared by reacting phenol under Friedel-Crafts conditions with from about 35 to 80 parts by weight for each 100 parts by weight of said phenol of a mixture of cyclopentadiene codimers.

(E) said mixture of cyclopentadiene codimers (when in a form substantially free of other materials wherein the sum of all component compounds of any given such mixture equals substantially 100 weight percent):

(F) from about 50 to 99 weight percent of compounds each molecule of which has:

(1) the dicyclopentadiene nucleus (2) from 10 through 13 carbon atoms (3) as nuclear substituents from 0 through 3 methyl groups, and (G) from about 1 to 50 weight percent of compounds each molecule of which is a codimer of cyclopentadiene with at least one acyclic conjugated alkadiene having from 4 through 6 carbon atoms per molecule.

9. In a process for making a laminate construction using a sheet-like member described in claim 1, the improvement which comprises the steps of:

(A) heating at least one such sheet-like member at temperatures in the range of from about 30 to 180° C. for a time to advance some to an extent such that the resulting sheet-like member has a flow of from about 3 to 20 percent, (B) forming at least one such so-advanced sheet-member into a layered configuration at least two layers thick with (C) subjecting the resulting layered configuration to pressures in the range of from about 50 to 2000 p.s.i. while maintaining temperatures in the range of from about 120 to 180° C. for a time sufficient to substantially completely thermoset said composition and thereby produce a desired laminate construction.

10. A process for making a laminate construction using a sheet-like member described in claim 5 comprising the steps of:

(A) forming at least one such sheet-like member into a layered configuration at least two layers thick with adjoining layers being substantially in face-to-face engagement, and (B) subjecting the resulting layered configuration to pressure in the range of from about 50 to 2000 p.s.i. while maintaining temperatures in the range of from about 120 to 180° C. for a time sufficient to substantially completely thermoset said composition and thereby produce a desired laminate construction.

References Cited

UNITED STATES PATENTS

| | | | |
|---|---|---|---|
| 3,048,508 | 8/1962 | Boiney et al. | 161—258 |
| 3,429,976 | 2/1969 | Nakagawa | 156—335 |

HAROLD ANSHER, Primary Examiner

W. E. HOAG, Assistant Examiner

U.S. Cl. X.R.

117—72, 76, 138.8, 143, 145, 155, 161; 156—332, 334, 335; 161—258, 259